US012373636B2

(12) United States Patent
Shen et al.

(10) Patent No.: US 12,373,636 B2
(45) Date of Patent: Jul. 29, 2025

(54) REWRITING TONE OF NATURAL LANGUAGE TEXT

(71) Applicant: GRAMMARLY, INC., San Francisco, CA (US)

(72) Inventors: Alice Shen, Berkeley, CA (US); Dmitry Unkovsky, Szczecin (PL); Yevhen Bochkov, Kyiv (UA); Jennifer van Dam, San Francisco, CA (US); Lily Ng, El Cerrito, CA (US); Mark Norris, San Francisco, CA (US); Maxim Gubin, Danville, CA (US); Megan Keough, Beacon, NY (US); Oleksandr Korniienko, Kyiv (UA); Yuriy Tanskyi, San Francisco, CA (US)

(73) Assignee: GRAMMARLY, INC.

( * ) Notice: Subject to any disclaimer, the term of this patent is extended or adjusted under 35 U.S.C. 154(b) by 251 days.

(21) Appl. No.: 17/951,751

(22) Filed: Sep. 23, 2022

(65) Prior Publication Data

US 2024/0104294 A1  Mar. 28, 2024

(51) Int. Cl.
*G06F 40/166* (2020.01)
*G06F 40/117* (2020.01)
(Continued)

(52) U.S. Cl.
CPC .......... *G06F 40/166* (2020.01); *G06F 40/117* (2020.01); *G06F 40/253* (2020.01);
(Continued)

(58) Field of Classification Search
CPC .... G06F 40/166; G06F 40/117; G06F 40/253; G06F 40/284; G06F 40/30; G06F 3/0482; G06F 40/216
(Continued)

(56) References Cited

U.S. PATENT DOCUMENTS 10,268,682 B2 * 4/2019 Chakra ................ G06F 40/253
11,361,151 B1   6/2022 Guberman et al.
(Continued)

FOREIGN PATENT DOCUMENTS

| AU | 2022256146 A1 | 11/2022 |
| CN | 115457923 A | 12/2022 |
| JP | 2021117444 A | 8/2021 |

OTHER PUBLICATIONS

International Search Report and Written Opinion, Application No. PCT/US2023/074894, Jan. 22, 2024, 10 pages.

*Primary Examiner* — Edwin S Leland, III
(74) *Attorney, Agent, or Firm* — Van Hoven PC; Jordan Becker

(57) ABSTRACT

In one embodiment, the disclosure provides a computer-implemented method, comprising receiving, by a computer system, electronic digital data representing a first text sequence in a first language, the first text sequence comprising unstructured natural language text; by one or more machine-learning models of the computer system, determining a score corresponding to the first text sequence, the score being determined by one or more rule-based filters and indicating one or more predicted tones; determining whether to modify the first text sequence based on the score of the first text sequence; in response to a determination to modify the first text sequence, modifying the first text sequence, the modifying comprising replacement of at least one or more words of the first text sequence to result in creating and digitally storing a second text sequence; and transmitting a graphical control element indicative of a tone associated with the second text sequence for display.

20 Claims, 6 Drawing Sheets

(51) Int. Cl.
*G06F 40/253* (2020.01)
*G06F 40/284* (2020.01)
*G06F 40/30* (2020.01)
G06F 3/0482 (2013.01)
G06F 40/216 (2020.01)

(52) U.S. Cl.
CPC ............ *G06F 40/284* (2020.01); *G06F 40/30* (2020.01); *G06F 3/0482* (2013.01); *G06F 40/216* (2020.01)

(58) Field of Classification Search
USPC ............................................................ 704/9
See application file for complete search history.

(56) References Cited

U.S. PATENT DOCUMENTS

| | | | | |
|---|---|---|---|---|
| 2015/0286617 | A1* | 10/2015 | Chakra | G06F 40/40 |
| | | | | 704/9 |
| 2019/0214013 | A1* | 7/2019 | Meher | G06F 40/174 |
| 2020/0184150 | A1* | 6/2020 | Yin | G06N 7/01 |
| 2021/0165960 | A1* | 6/2021 | Eisenschlos | G06F 40/284 |
| 2022/0045975 | A1* | 2/2022 | Flöther | H04L 51/216 |
| 2022/0366293 | A1* | 11/2022 | Abhishek | G06F 40/284 |
| 2022/0400176 | A1 | 12/2022 | Wiechman et al. | |
| 2022/0405802 | A1 | 12/2022 | Myslinski | |
| 2023/0123574 | A1 | 4/2023 | Guberman et al. | |
| 2024/0104294 | A1* | 3/2024 | Shen | G06F 40/30 |

\* cited by examiner

REWRITING TONE OF NATURAL LANGUAGE TEXT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Grammarly, Inc.

TECHNICAL FIELD

One technical field of the present disclosure is computer-implemented artificial intelligence, in the subfield of natural language processing, using models that are programmed to derive semantics such as tone. Another technical field is computer-implemented natural language text addition, modification, or suggestion. Another technical field is cross-platform computer-implemented or programmed systems for assisting users in the drafting of natural language text.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Natural language is a complex phenomenon that may be difficult to accurately model using digital data and machine-executable instructions. Nevertheless, since the advent of artificial intelligence (AI), computer-implemented natural language processing (NLP) systems have developed certain capabilities to derive semantic meaning from an electronic text or to analyze the syntactic correctness of the electronic text. For example, machine learning (MIL)-based techniques have been developed for deriving semantics such as a classification of a document containing the text, the topics of the text, the meaning of the text or portions thereof, a sentiment of the text or portions thereof, an intent of the text or portions thereof, tone of the text, targeted tone of the text, or other semantics.

As communications between people are increasingly conducted via electronic means, a critical aspect of communication is setting the right tone of electronic text. An effective tone may enhance the relationship between the writer and the recipient, while an ineffective tone may risk damaging that relationship. Further, the effectiveness of the tone may vary by context. For example, the tone of communication in work, school, or other environments are distinct from interpersonal communications between friends and family. While ML-based techniques have been developed for detecting a tone of electronic text, it remains challenging for writers to use an output of a detected tone to improve their writing for several reasons. For example, a writer drafting an email to a colleague may intend for the electronic text to have a professional, confident, and friendly tone. However, the writer may receive an output indicating that a portion of the electronic text has been identified as "rude." In this case, the writer may modify portions of the electronic text to remove text that sounds rude. However, the modifications by the writer may now sound uncertain or unconfident, which is not the user's intent of the text. Further, automatic and/or manual modifications to the electronic text may change the texts overall meaning. Based on the foregoing, there is an acute need in the relevant technical fields for a flexible computer-implemented high-speed cross-platform system with real-time response capable of inspecting a draft text, identifying a tone of the text, suggesting alternative text that improves the original or supplements the original in a manner that clarifies the text and/or aligns the tone with a user-intended tone.

SUMMARY

The appended claims may serve as a summary of the invention.

DETAILED DESCRIPTION

Figure 1:
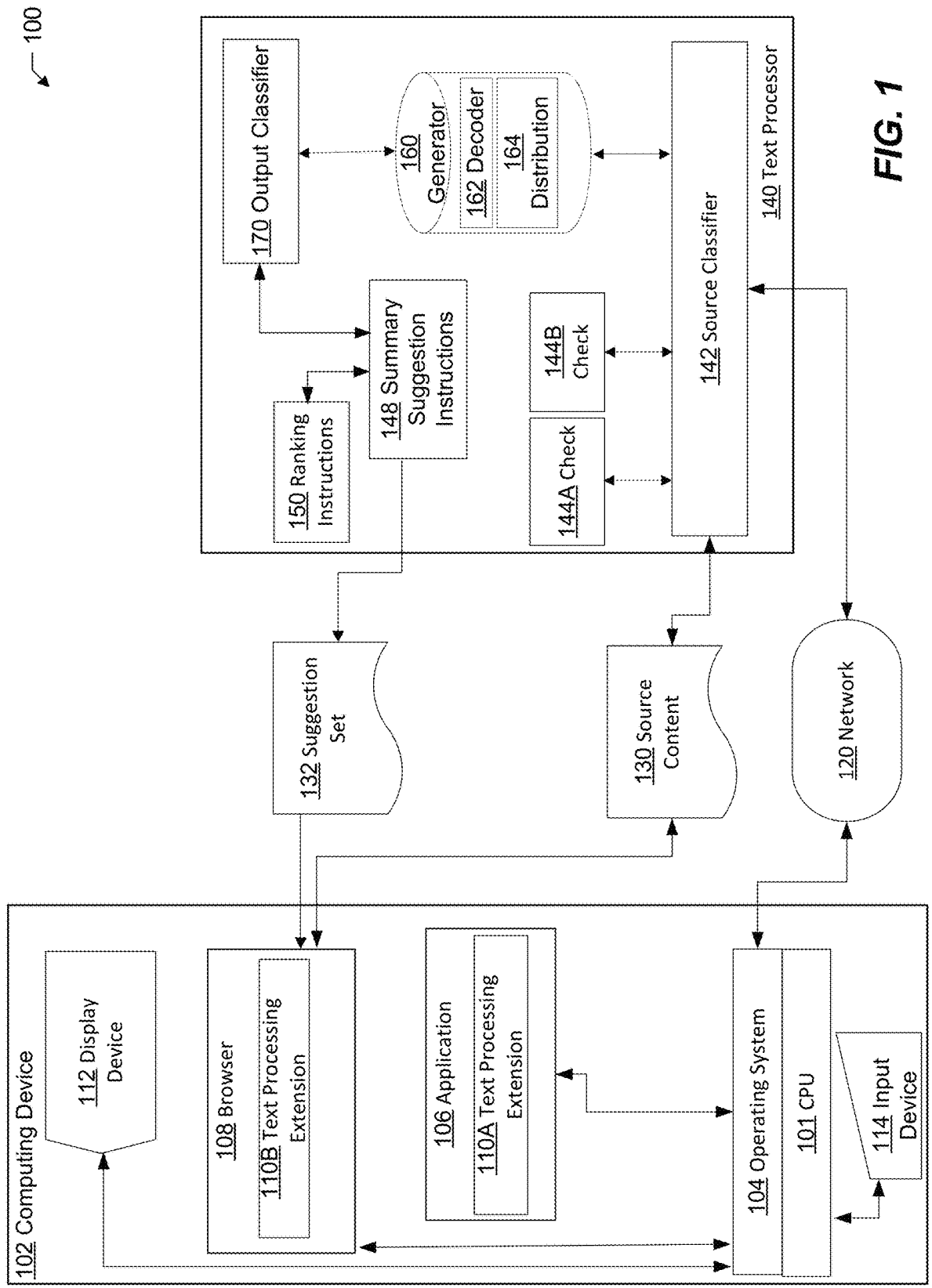
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
    2.1 Distributed Computer System Example
    2.2 Example Rewriting of Natural Language Text Processing—Rephrase Suggestions
    2.3 Example Process Flows
3. Implementation Example—Hardware Overview 1. General Overview In one embodiment, a computer-implemented method is programmed to receive, by a computer system, electronic digital data representing a first text sequence in a first language, the first text sequence comprising unstructured natural language text. Once the first text sequence has been received, the computer system may determine a score corresponding to the first text sequence, the score being determined by one or more rule-based filters, and the score indicates one or more predicted tones. In one embodiment, a computer-implemented process may use dependency relation data associated with a word pair of the first text sequence to compute the score, where the dependency relation data may be determined by an identified syntactic structure of the first text sequence. In one embodiment, a computer-implemented process may use modifier relation data associated with the word pair of the first text sequence to increase or decrease the score of the first text sequence. The computer system may determine whether to modify the first text sequence based on the score corresponding to the first text sequence. In response to a determination to modify the first text sequence, the computer system may modify the first text sequence, the modifying comprising replacement of at least one or more words of the first text sequence to result in creating and digitally storing a second text sequence in the first language. In one embodiment, the computer-implemented method may determine a confidence level score of the first text sequence, where the confidence level corresponds to a determined amount of hedging. The computer-implemented method may then generate one or more replacement text sequences, where each respective text corresponds to a particular confidence level score. In one embodiment, the modification of the first text sequence may be determined by one or more pre-determined rules.

In one embodiment, the computer-implemented method may use a digital lexicon to associate at least one word of the first text sequence with a tone label.

In one embodiment, the computer-implemented method may transmit a graphical control element indicative of a tone associated with the first text sequence and a tone associated with the second text sequence for display. In one embodiment, before transmitting the graphical control element, the computer-implemented method may rank the tones associated with the first and second text sequences based on a ranking criterion.

In one embodiment, the computer-implemented method may be programmed to use a digital lexicon to associate the identified syntactic structure of the first text sequence with one or more tone labels.

In one embodiment, the computer-implemented method may be programmed to generate an output set of summary points and corresponding suggestions. As an example and not by way of limitation, the output set of summary points and corresponding suggestions may be ranked based on a ranking criterion and the computer-implemented method may transmit a graphical control element of the output set of summary points and corresponding suggestions based on the ranking criterion for display.

In one embodiment, the computer-implemented method may be programmed to output a set of graphical control elements, where a graphical control element of the set of graphical control elements may be indicative of a candidate tone of a set of candidate tones. The method may then receive tone ranking data and modify the output set of summary points and corresponding suggestions.

2. Structural & Functional Overview 2.1 Distributed Computer System Example

FIG. 1 illustrates a distributed computer system 100 showing the context of use and principal functional elements with which one embodiment could be implemented. In an embodiment, computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

In particular embodiments, at runtime, one or more of application 106 and browser 108 may load, or are installed with, a text processing extension 110A, 110B, which comprises executable instructions that are compatible with text processor 140 and may implement application-specific communication protocols to rapidly communicate text-related commands and data between the extension and the text processor. Text processing extension 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that, if text processing extension 110A, 110B is implemented as an extension, then said extension is compatible with and can be functionally integrated with a host application 106 or browser 108. As explained further herein with more specificity, text processing extension 110A, 110B may also be implemented as a standalone application instead of as an extension.

Figure 2:
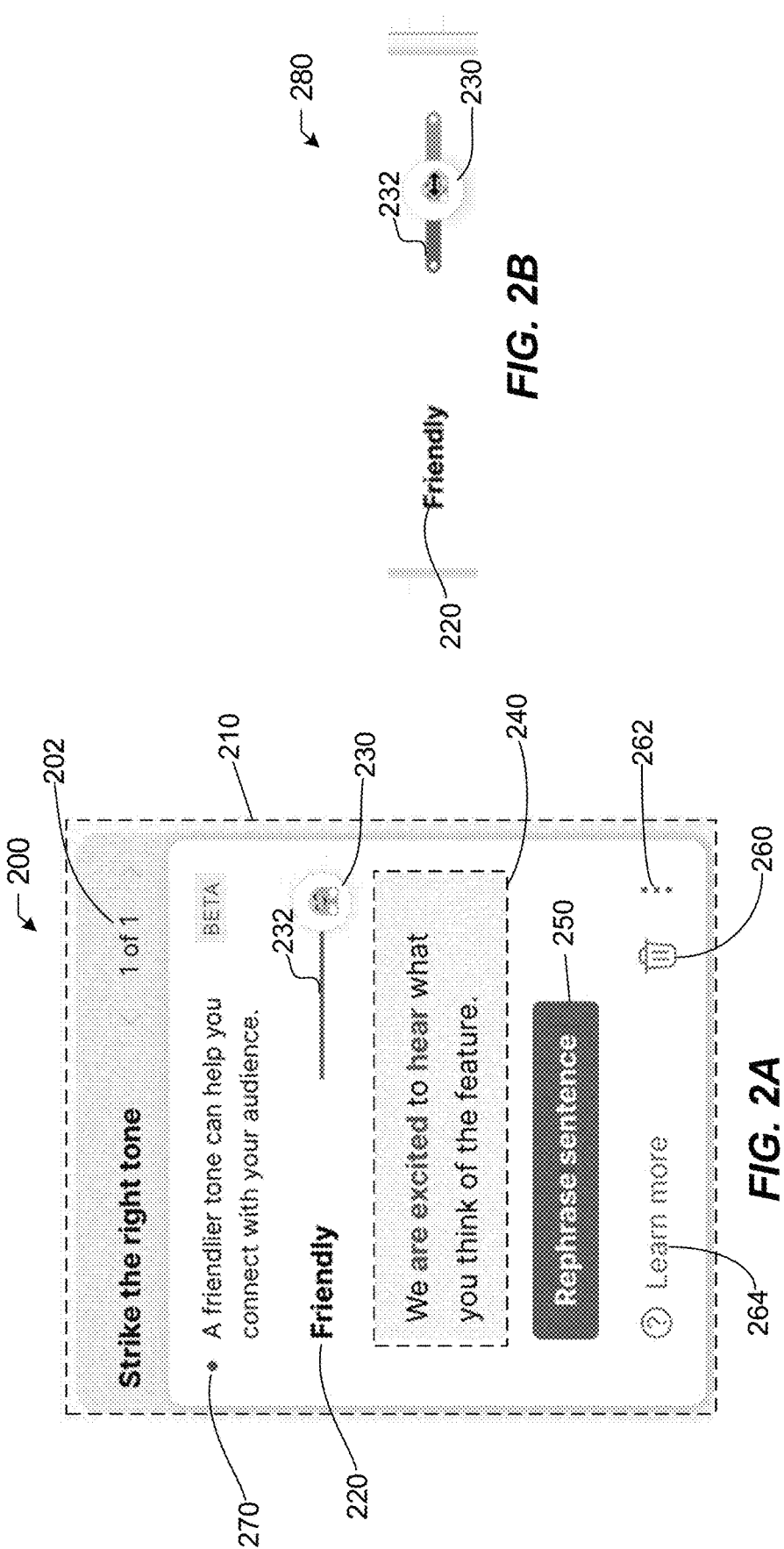
FIG. 2A, FIG. 2B illustrate example graphical control elements for classification of a source text, determining rephrase suggestions, and presenting the rephrase suggestions.

In some embodiments, text processing extension 110A may be installed as a standalone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein.

In one embodiment, each text processing extension 110A, 110B may be linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B, to detect text that is entered in input fields or panels of application 106 or browser 108. For example, application 106 or browser 108 may instruct the application or browser to delete a character, word, sentence, or another unit of text, and instruct the application or browser to insert a character, word, sentence, or another unit of text.

Each of the text processing extensions 110A, 110B may be programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document or email thread that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the text processor 140 may comprise one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing extensions 110A, 110B may execute at a second computer.

In one embodiment, text processor 140 may comprise a source classifier 142 that is coupled indirectly to network 120. Source classifier 142 may be programmed to receive source content 130, perform a plurality of checks on the source content 130, and distribute text changes to a plurality of different checks 144A, 144B. As an example and not by way of limitation, source classifier 142 may be a RoBERTA-based classifier. As another example and not by way of limitation, source classifier 142 may be a machine-learning based transform model. Although the disclosure discusses the forementioned classifiers, this disclosure contemplates any suitable classifier and/or machine-learning model. In particular embodiments, source classifier 142 may perform a filtration function on source content 130. As an example and not by way of limitation, source classifier 142 may determine the most promising tone rewrite categories to focus on based on a frequency of rewrite, user value, and/or complexity. In one embodiment, source classifier 142 may apply one or more pre-filters to source content 130. One example of a pre-filter may be a determination that the sentence is appropriate for a tone rewrite. Another example of a pre-filter may be determining that the context is right for a rewrite on either a paragraph, document, or thread-level.

In particular embodiments, after applying the one or more pre-filters, source classifier 142 may apply one or more post-filters. As an example and not by way of limitation, source classifier 142 may perform filtering using a bucketing process in which source classifier 142 may classify potential rewrites into one or more specific types. As another example, bucketing may include generating an explanation of why a particular rewrite was generated to be displayed to the user along with the rewrite. For example, the explanation may explain why a particular rewrite was generated in accordance with a polite tone versus a friendly tone. It is understood that post-filtering may occur at source classifier 142, generator 160, and/or output classifier 170.

In particular embodiments, source classifier 142 may identify a plurality of potential tone suggestions; for example, source classifier 142 may be programmed to filter the potential tone suggestions to allow only one (for example, the most valuable) tone suggestion per sentence.

In an embodiment, source content 130 may comprise a plurality of different sentences each yielding different label values for different types or different categories when the sentences are processed via source classifier 142. In particular embodiments, source classifier 142 may determine dependency relation data associated with a word pair of source content 130; for example, the source classifier can be programmed to use the dependency relation data to compute a score corresponding to the source content 130. As an example and not by way of limitation, the dependency relation data may be determined by an identified syntactic structure of source content 130. As another example and not by way of limitation, modifier relation data associated with the word pair of source content 130 may be used to modify the score, either increasing or decreasing the score of source content 130.

In particular embodiments, source classifier 142 may use one or more digital lexicons to associate the identified syntactic structure of source content 130 with one or more tone labels. In particular embodiments, source classifier 142 may not identify one or more tones and instead may transmit source content 130 to generator 160. In response, the generator 160 can be programmed to access one or more digital lexicons to associate the identified syntactic structure of source content 130 with one or more tone labels.

In particular embodiments, the seq2seq backbone of source classifier 142 may include one or more pretrained models such as GPT2 (Generative Pre-Trained Transformer 2), BART, and/or OPC.

In one embodiment, source classifier 142 is programmed to distribute each and every text change arriving from one or more of text processing extensions 110A, 110B to all of checks 144A, 144B, which may execute in parallel and/or in independent threads.

In one embodiment, text processor 140 may be programmed to programmatically receive a digital electronic object comprising a source text (for example, source content 130), a message with the source text, an application protocol message with the source text, an HTTP POST request with the source text as a payload, or using other programmed mechanics. In various embodiments, the first computer executes a text processor that is communicatively coupled to a text processing extensions 110A, 110B that is executed at the second computer and programmatically receives the digital electronic object comprising the source text via a message initiated at the text processing extension and transmitted to the text processor 140 and/or the text processing extension 110A, 110B executes in association with an application program that is executing at the second computer. The text processing extensions 110A, 110B may be programmed to automatically detect a change in a text entry window of the application program and, in response, to initiate the message; and/or the text processor 140 executes in association with browser that is executing at the second computer, a text processing extension 110A, 110B being programmed to automatically detect a change in a text entry widget of the browser 108 and, in response, to initiate the message.

Each of the checks 144A, 144B may be programmed to execute a different form of checking or processing of a text change that has arrived. Example functions that checks 144A, 144B could implement include grammar checking, tone detection, spell checking, and translation. In an embodiment, checks 144A, 144B may be programmed as a phrase check. In an embodiment, phrase check (for example, checks 144A, 144B) may comprise a multi-class text classifier coupled to summary suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, checks 144A, 144B may be coupled to or can access, one or more phrase stores, which may be integrated with text processor 140 or implemented as separate storage. In an embodiment, the one or more phrase stores may comprises a database, flat file system, object store, or another digital data repository that stores a large number of textual phrase suggestions, in association with category values or tags that specify a category or type of communication, text, or document in which the suggestions could be substituted. Thus, phrase checks and/or text processor 140 may be programmed for evaluating each particular source text unit among the plurality of source text units using a trained multi-class text classifier machine learning model and receiving a classification output from the multi-class text classifier that classifies each particular source text unit as a particular class of phrase among a plurality of possible classes of phrases.

In one embodiment, source classifier 142 may transmit text to generator 160. As an example and not by way of limitation, generator 160 may comprise one or more decoder modules 162 and/or produce one or more distribution modules 164. Generator 160 may receive processed source content 130 from source classifier 142. The generator 160 can be programmed to identify one or more modifications and candidate replacement content to source content 130. Generator 160 may rank and filter the candidate replacement content (for example, words, phrases, sentences) according to one or more pre-defined rules. In particular embodiments, generator 160 may identify a word for replacement within source content 130.

For example, generator 160 may identify a plurality of replacement words associated with one word of source text 130. In this case, generator 160 may tokenize the sentence and produce a distribution for the next tokens in the sentence via distribution module 164. Generator 160 may evaluate the distribution as produced by distribution module 164 to filter the many possible candidate replacement words, as each word may have a slightly different probability. In particular embodiments, generator 160 may measure determined probabilities of each word against a threshold. As an example and not by way of limitation, if the candidate replacement word has a low probability value, the candidate replacement word may not be displayed to the user via a graphical user interface.

In particular embodiments, generator 160 may modify source content 130 by determining a confidence level score of the text sequence of source content 130. As an example and not by way of limitation, the confidence level score may correspond to a determined amount of hedging, as discussed in detail later in this disclosure. In response to the determined confidence level score, generator 160 may generate one or more replacement text sequences. Each respective text sequence may correspond to a particular confidence level score.

In one embodiment, generator 160 may be communicatively coupled to output classifier 170. In particular embodiments, after receiving data from generator 160, output classifier 170 may apply one or more filters to the received data. As an example and not by way of limitation, output classifier 170 may perform filtering using a bucketing process, in which the output classifier may classify potential rewrites into one or more specific types. As another example, bucketing may include generating an explanation of why a particular rewrite was generated to be displayed to the user along with the rewrite. For example, the explanation may explain why a particular rewrite was generated in accordance with a polite tone versus a friendly tone.

In particular embodiments, output classifier 170 may identify a plurality of potential tone suggestions. The output classifier 170 can be programmed to filter the potential tone suggestions to allow only one (for example, the most valuable) tone suggestion per sentence. Output classifier 170 may generate summary suggestion instructions 148 and ranking instructions 150 and transmit suggestion set 132 to computing device 102 for display to a user. In particular embodiments, output classifier 170 may generate a graphical control element based on the ranking criterion. The graphical control element may represent a scale or any other suitable user interface element. In particular embodiments, output classifier 170 may instruct summary suggestion instructions 148 to generate a set of summary points and corresponding rephrase suggestions; for example, the set of summary points and corresponding rephrase suggestions may be transmitted as a group in suggestion set 132.

In particular embodiments, ranking instructions 150 may be programmed to rank an initial set of rephrase suggestions 240. For example, ranking instructions 150 may be programmed to score the candidate rephrase suggestions, and to select the top N candidates. The value "N" may vary in different embodiments; e example values are "1" to "10" or any integer within a range of "1" to "10". Ranking instructions 150 may be programmed to rank the candidate rephrase suggestions according to any useful ranking criterion such as popularity across a community of users, user preferences, similarity to the original source text, dissimilarity to the original source text, or other criteria.

In particular embodiments, ranking instructions 150 may rank the output set of summary points and corresponding rephrase suggestions within suggestion set 132 based on one or more ranking criterion. As an example and not by way of limitation, suggestion set 132 may be transmitted to a graphical element for display based on the ranking criterion.

In particular embodiments, output classifier 170 may instruct summary suggestion instructions 148 to output a set of graphical control elements, in which one graphical control element of the set of graphical control element may be indicative of a candidate tone of a set of candidate tones. In particular embodiments, a user may provide input related to ranking tones, accepting tone suggestions, and/or declining tone suggestions. Output classifier 170 and/or generator 160 may then modify suggestion set 132 according to the user input.

2.2 Example Rewriting of Natural Language Text Processing—Rephrase Suggestions In one embodiment, a computer-implemented process is programmed to detect a type or category of document that is being drafted and to suggest one or more phrases or sentences to substitute for the original, the suggested text being potentially more aligned with one or more target tones than the writer's original text.

Suggested text phrases may be selected from a large corpus of previously manually drafted sentences and phrases. Selected text phrases may be ranked and filtered to result in suggesting a manageable set of text phrases. With this approach, adding specially chosen content to existing content can change the warmth or tone of the text while preserving its meaning. Unlike prior approaches, in an embodiment, the process may be programmed to artificially understand the intent of the original text as a basis of suggesting other content to add. Furthermore, embodiments may interoperate with a visual or graphical user interface that is programmed to enable users to see what the change to the text will be and whether they want it before they engage with the suggestion.

FIG. 2A, FIG. 2B illustrate example graphical control elements 200 for classification of a source text, determining rephrase suggestions, and presenting the rephrase suggestions. FIG. 2A, FIG. 2B and each other graphical control element herein is intended as an illustration at the functional level at which skilled persons, in the art to which this disclosure pertains, communicate with one another to describe and implement algorithms using programming. Referring first to FIG. 2A, in one embodiment, a tone summary window 210 is displayed via a graphical user interface of computing device 102 and may be programmed to present a plurality of functions to the user. For example, tone summary window 210 may provide tone suggestions and summaries in real-time. Tone summary window 210 may display one or more target tones as output by output classifier 170 and transmitted to computing device via summary suggestion instructions 148.

In particular embodiments, tone summary window 210 may present one or more target tones 220. As an example and not by way of limitation, element 202 may indicate one or more detected tones are available for display to the user.

In particular embodiments, tone summary window 210 may display an indication of one or more target tones 220. In the example of graphical control element 200, the target tone 220 identified is "Friendly." In particular embodiments, description 270 may display a description of the target tone. As an example and not by way of limitation, description 270 corresponding to the target tone 220 of "Friendly" may read "A friendlier tone can help you connect with your audience."

In particular embodiments, tone summary window 210 may be programmed to display one or more selectable icons for user interaction. User interaction with the one or more selectable icons may be detected by a touchpad, mouse, a trackball, or cursor direction key for communicating direction information and command selections for controlling cursor movement on the display of computing device 102. Computing device 102 may have at least two degrees of freedom in two axes, a first axis (for example, x) and a second axis (for example, y) that allows the device to specify positions in a plane. As another example, input devices may be a wired, wireless, or optical control device such as a joystick, wand, console, or other suitable input device. For example, when icon 230 is positioned on slide bar 232, the input may prompt tone summary window 210 to display the "before" text (for example, original source text).

In particular embodiments, tone summary window 210 may display rephrase suggestion 240 to the user. Rephrase suggestion 240 may display portions of the original source text along with rephrase suggestions 240 of one or more words in the original source text. As an example and not by way of limitation, rephrase suggestion 240 may indicate portions of the original source text are to be rewritten through the use of bold font, colored font, underlines, italic font, and/or any other suitable method of distinguishing the original source text from portions of rephrased text.

In particular embodiments, rephrase option 250 may be a selectable option, and the user may accept the rephrase suggestion 240 through an interaction with the user interface. In the example of FIG. 2A, although rephrase option 250 may be labelled as "Rephrase Sentence," this disclosure contemplates any suitable label.

In particular embodiments, in response to a user's selection of rephrase option 250, the text processing extensions 110A, 110B may receive instruction to modify the text of the original source text. Examples of modification of the original source text may include but are not limited to deleting text, adding text, modifying text, reordering the text, adding a digital markup, and adding a graphical control element indicative of a target tone.

In particular embodiments, when selected, the rephrase option 250 may instruct text processor 140 to adopt the rephrase suggestion 240 and modify the original source text (for example, source content 130) accordingly. As another example and not by way of limitation, when selected, decline option 260 may instruct text processor 140 to ignore modifications and maintain the original source text as is. In particular embodiments, the text processor 140 may be programmed to receive, using the text processing extension 110A, 110B, a signal from a user of the mobile computing device or the other computing device that hosts or executes the text processing extension 110A, 110B to accept (for example, rephrase option 250) or decline (for example, decline option 260) one or more of the phrase suggestions, specifying that a particular tone identification and/or phrase suggestion was selected.

In particular embodiments, tone summary window 210 may present a learn more function 264, which can be programmed to display, in response to a selection, a separate window showing an explanation of the rephrase suggestion 240.

In particular embodiments, text processor 140 may be programmed to determine whether an accept option (for example, rephrase option 250) or equivalent was received as input. If input is received, text processor 140 may be programmed to update, using text processing extension 110A, 110B, the original source text using the accepted rephrase suggestion 240. Updating may comprise, for example, the text processing extension 110A, 110B programmatically invoking an API call, internal method, or other programmed function, of the browser 108 or application 106 that the text processing extension 110A, 110B extends, to insert the rephrase suggestion 240 into the original source text (for example, source content 230), or to delete an original portion of text (for example, a sentence) and insert the rephrase suggestion 240.

If no input is received, the text processor 140 may categorize the absence of an accept signal as a decline signal. As an example and not by way of limitation, signals received by text processor 140 may be programmed to update training data, used to train one or more machine-learning models and/or classifiers, based on the signal. Thus, text processor 140 may form a feedback loop by which training data is continuously updated based on user signals to indicate whether a particular suggestion was correct, or useful, or not.

Updating may comprise, for example, the text processing extension 110A, 110B programmatically invoking an API call, internal method, or other programmed function, of the browser 108 or application 106 that the text processing extension 110A, 110B extends, to insert the rephrase suggestion 240 into the original source text (for example, source content 230), or to delete an original portion of text (for example, a sentence) and insert the rephrase suggestion 240.

In particular embodiments, functionality 262, when selected, may generate an additional graphical control element with a plurality of options, information, or any other suitable data.

In particular embodiments, as demonstrated in FIG. 2B, the user may adjust icon 230 along slide bar 232; in an embodiment, user input for positioning the icon on the far-left of slide bar 232 causes a display of the original source text, and positioning the icon on the far-right side of slide bar 232 may display rephrase suggestion 240. As another example and not by way of limitation, the user may adjust icon 230 along slide bar 232 to indicate a tone intensity of the target tone 220. In particular embodiments, the graphical user interface of tone summary window 210 may display a slide bar 232 that is programmed to use the position of icon 230 to indicate a particular tone intensity. As an example and not by way of limitation, in the example of graphical control element 280, a position of icon 230 on the far left of slide bar 232 may indicate a user's preference for a "less friendly" tone, and a position of icon 230 on the far right of slide bar 232 may indicate a user's preference for a "more friendly" tone. The position of icon 230 may transmit instructions to generator 160 and/or output classifier 170 to generate one or more suggestion sets of target tones 220 within a particular tone intensity range as specified by the user. In response to user selection of a particular tone intensity range, checks 144A and/or 144B may evaluate the source text (for example, source content 130) using a trained multi-class text classifier machine learning model. For example, checks 144A, 144B may be coupled to or can access one or more phrase stores, which may be integrated with text processor 140 or implemented as separate storage. In some embodiments, the one or more phrase stores may comprise a database, flat file system, object store, or other digital data repository that stores a large number of textual phrase suggestions in association with category values or tags that specify a category or type of communication in which the suggestion may be substituted. For example, checks 144A, 144B and/or text processor 140 may be programmed for evaluating each particular text unit among a plurality of text units using a trained multi-class text classifier that classifies each particular source text unit as a particular class of phrase among a plurality of possible classes of phrases and or a particular class of word among a plurality of possible classes of words. Summary suggestion instructions 148 may be programmed to, in part, output the suggestion set 132 to transmit text to text processing extension 110A, 110B.

In particular embodiments, text processor 140 may be programmed to detect that a suggestion should be given and select one or more suggestions to provide. In one approach, checks 144A, 144B may be programmed to form vectors in a labeled dataset digitally stored in one or more phrase stores. In this manner, the text processor 140 may be programmed for dividing the original source text into one or more source text units (for example, a sentence). The dividing may occur via a parser or other programmed algorithm capable of inspecting natural language text, identifying tokens or units of the text, identifying syntactic units, and so forth. Other units may be used in other embodiments including clauses, multi-sentence groups, paragraphs, and so forth.

Figure 3:
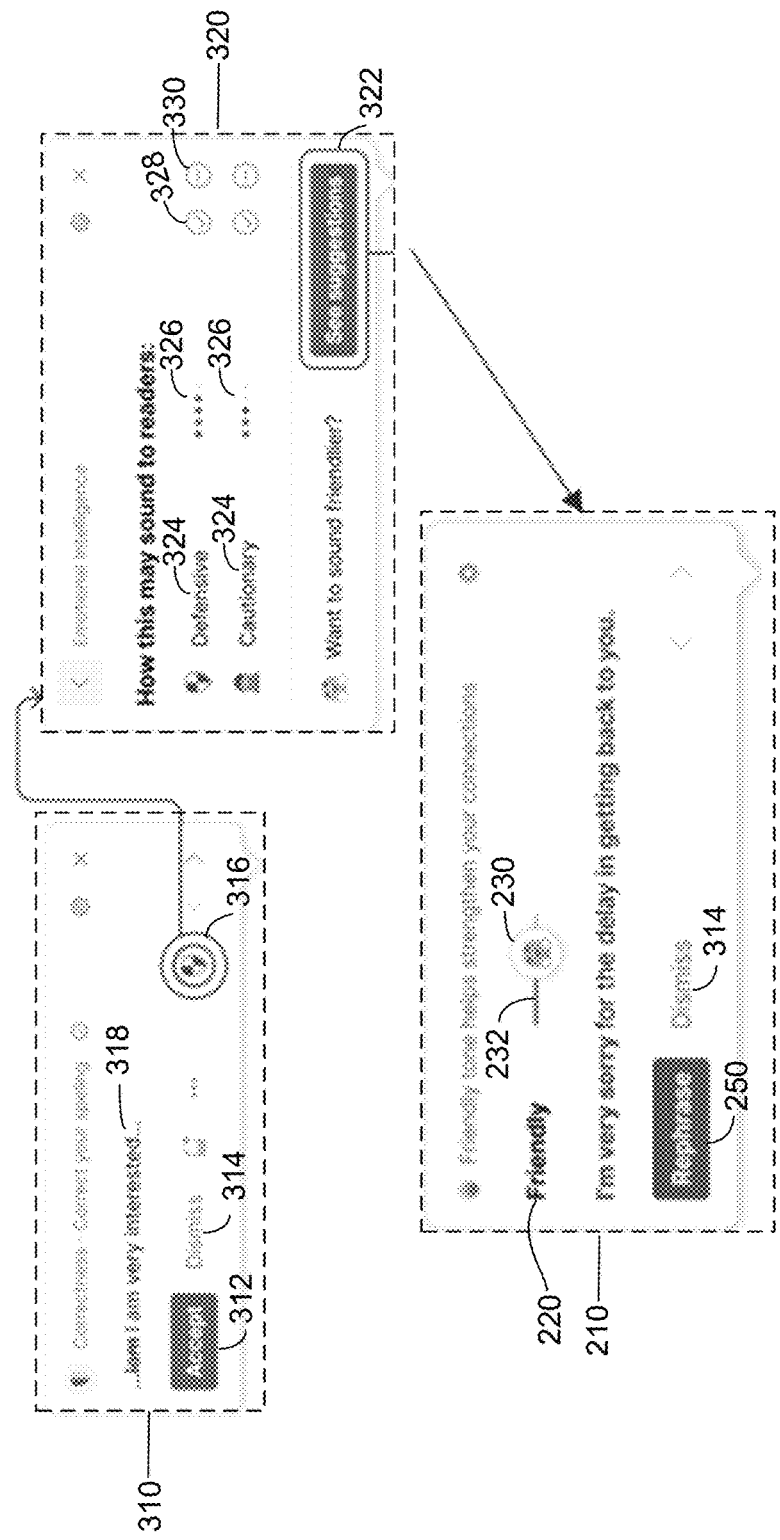
FIG. 3 illustrates an example of graphical control element for presenting correction of a source text, one or more tone identifications for the source text, and rephrase suggestions.

FIG. 3 illustrates an example of graphical control elements 300 for presenting correction of a source text, one or more tone identifications for the source text, and rephrase suggestions 240. In particular embodiments, correction window 310 may present one or more grammar suggestions 318. As an example and not by way of limitation, correction window 310 may display one or more grammar suggestions 318 along with one or more selectable icons for user interaction. As an example and not by way of limitation, suggested corrections may be displayed within grammar suggestion 318 as bold text, underlined text, italicized text, colored text, or any other suitable distinction of text. In particular embodiments, when selected, the accept option 312 may instruct text processor 140 to adopt the grammar suggestions 318 and modify the original source text accordingly. As another example and not by way of limitation, when selected, the dismiss option 314 may instruct text processor 140 to ignore modifications and maintain the original source text as is. In particular embodiments, the text processor 140 may be programmed to receive, using the text processing extension 110A, 110B, a signal from a user of the mobile computing device or the other computing device that hosts or executes the text processing extension 110A, 110B to accept (for example, accept option 312) or decline (for example, dismiss option 314) one or more of the phrase suggestions, specifying that a particular grammar and/or phrase suggestion was selected to add to the text. For purposes of illustrating a clear example, FIG. 3 and aspects of this description use the labels accept option 312 and/or dismiss option 314 to refer to input signals that could be received, but these labels are merely examples and different implementations may use other internal values to identify different input.

In particular embodiments, text processor 140 may be programmed to determine whether an accept option 312 or equivalent was received as input. If no input is received, the text processor 140 may categorize the absence of an accept signal as a decline signal. As an example and not by way of limitation, signals received by text processor 140 may be programmed to update training data, used to train one or more machine-learning models and/or classifiers, based on the signal. Thus, text processor 140 may form a feedback loop by which training data is continuously updated based on user signals to indicate whether a particular suggestion was correct, or useful, or not. In particular embodiments, one or more machine-learning models may store the user's preferences in one or more datastores and update the user's preferences in ranking instructions 150.

In particular embodiments, correction window 310 may display one or more tone icons 316, in which each identified tone 324 may be associated with a particular icon. As demonstrated in FIG. 3, tone icon 316 is associated with a "Defensive" tone, as further shown in emotional intelligence window 320. In particular embodiments, emotional intelligence window 320 may display one or more identified tones 324. As an example and not by way of limitation, identified tones 324 may include "defensive", "cautionary", "friendly", "confident", and/or any other suitable tone identification.

In particular embodiments, emotional intelligence window 320 may display a tone intensity level 326 associated with each respective identified tone 324. As an example and not by way of limitation, tone intensity level 326 may be displayed by a plurality of icons, scales, or any other suitable method of displaying one or more tone intensity levels 326.

In particular embodiments, tone icons/functionality/selectable options 328 may allow a user to provide feedback on the one or more identified tones 324 through selection of a positive indicator 328 or negative indicator 330, in which the selection of positive indicator 328 or negative indicator 330 may train one or more machine-learning models (for example, source classifier 142, output classifier 170) on the user feedback.

In particular embodiments, emotional intelligence window 320 may prompt a user to review one or more tone suggestions and corresponding rephrase suggestions 240. As an example and not by way of limitation, as displayed in FIG. 3, in response to identifying tones as "Defensive" and "Cautionary," the prompt may read "Want to sound friendlier?", and display button 322. In this example, button 322 may read "See suggestions," where in response to a user selection of button 322, the graphical user interface may progress to tone summary window 210. As discussed previously in FIG. 2A, FIG. 2B, tone summary window 210 may display an indication of one or more target tones 220, ion 230, slide bar 232, rephrase option 250, and dismiss option 314.

2.3 Example Process Flows

Figure 4:
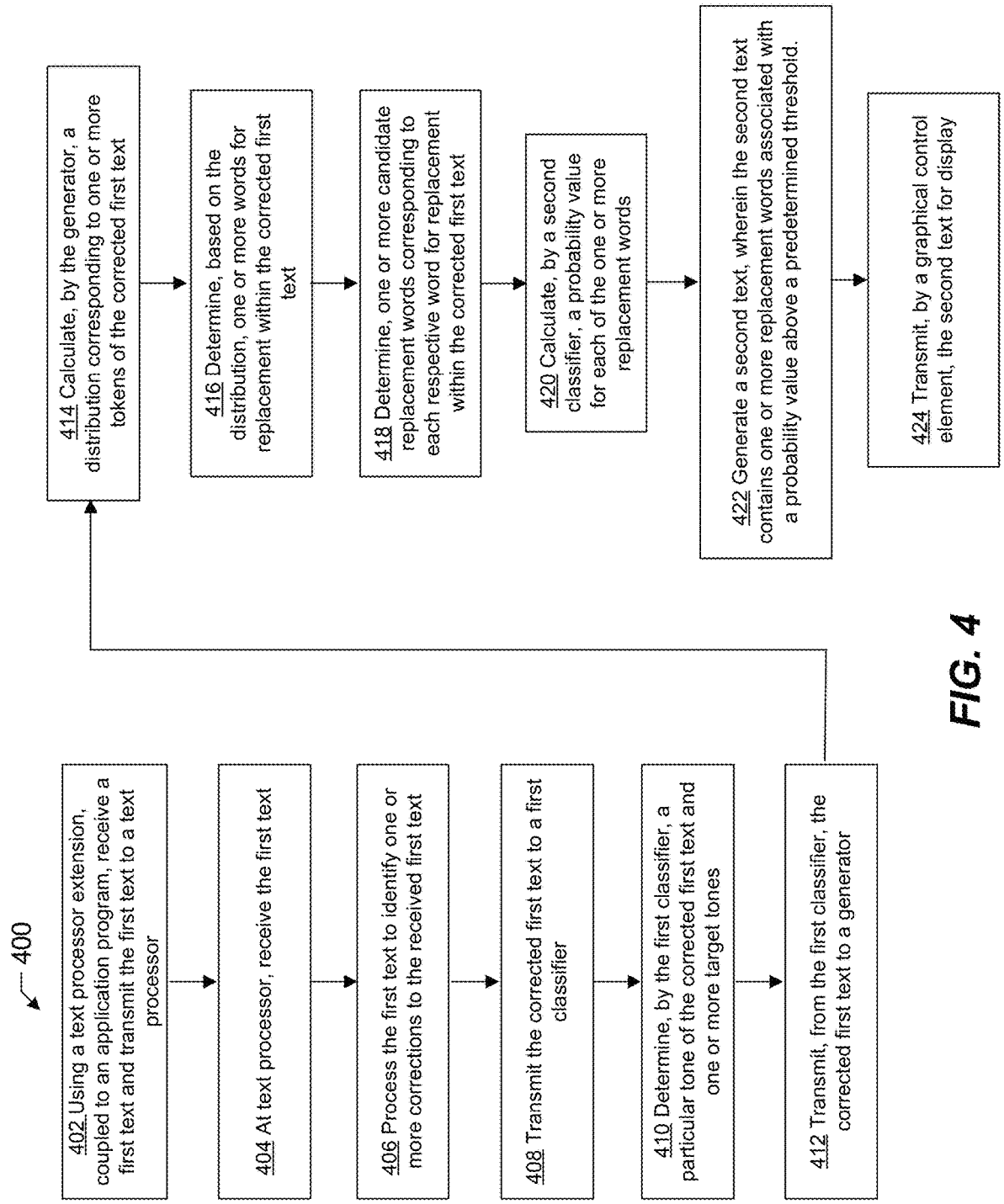
FIG. 4 illustrates an example computer-implemented or programmed process for generating and displaying rephrase suggestions output by one or more machine-learning classifiers in response to identification of a targeted tone of a source text.

FIG. 4 illustrates an example computer-implemented or programmed process 400 for generating and displaying rephrase suggestions output by one or more machine-learning classifiers in response to identification of a targeted tone of a source text. The operations of process 400 as shown in FIG. 4 may be implemented using processor-executable instructions stored in computer memory. Although this disclosure describes the process of FIG. 4 as being performed by computing system 100, this disclosure contemplates any suitable system, device, or implemented techniques.

In particular embodiments, at step 402, text processing extension 110A coupled to application 106 may receive a first text (for example, original source text), and the text processing extension 110A may transmit the first text to text processor 140. In an alternate embodiment, text processing extension 110B coupled to browser 108 may receive a first text, and in response, the text processing extension 110B may transmit the first text to text processor 140. In some embodiments, text processor 140 may be implemented as a back-end server and is programmed to distribute one or more text changes to a plurality of extensions that are programmed to execute multiple types of checks on the text, and the process of FIG. 4 is implemented as one of the checks. For example, source content 130 is received at checks 144A, 144B via source classifier 142.

In particular embodiments, at step 404, text processor 140 may receive the first text (for example, original source text), and in response the text processor 140 may process the first text to identify one or more corrections to the received first text, as in step 406. In an embodiment, source classifier 142 may be programmed to determine that a suggestion should be generated, and then output classifier 170 may select one or more suggestions to provide. In one approach for detection that a suggestion should be given, checks 144A, 144B may be programmed to form vectors that represent sentences and the surrounding context of the first text sequence, then searches for matching vectors in a labeled dataset that is digitally stored in one or more phrase stores. The matching may use fuzzy similarity algorithms. In this manner, text processor 140 may be programmed for dividing the first text sequence into one or more source text units, and one example of the source text unit is a sentence. The dividing may use a parser or other programmed algorithm capable of inspecting natural language text, identifying tokens or units of the text, identifying syntactic units, and so forth. Other units may be used in other embodiments including clauses, multi-sentence groups, paragraphs, and so forth.

Generator 160 may use a machine learning model, structured as a text classifier, trained on a large corpus of source sentences, to evaluate a current sentence, outputting a classification of where to inject a suggestion. In one embodiment, generator 160 may implements a multi-class machine learning model capable of outputting a plurality of different label values, each label value representing a type or category of intent and/or tone represented in the first text sequence.

In particular embodiments, at step 408, text processor 140 may transmit the corrected first text to a first classifier (for example, source classifier 142). As an example and not by way of limitation, source classifier 142 may process the first text via one or more machine-learning models, each of the machine-learning models comprising any of rule-based classifiers or filters.

In particular embodiments, at step 410, the first classifier (for example, source classifier 142) may determine a particular tone of the corrected first text. The first classifier may also identify one or more target tones of the first text. Source classifier 142 may be programmed to identify context, such as the between the user and the intended audience of the first text. For example, source classifier 142 may determine that a user is corresponding with friends or family, in which case source classifier 142 may suggest friendly, informal tone suggestions. As another example and not by way of limitation, source classifier 142 may determine that the user is writing an email to a colleague, and the target tone suggestions may be confident, formal tone suggestions. Examples of context may include horizontal relationships, hierarchical relationships, relationships between teachers and students, clients, vendors, proprietors, landlords, supervisors, co-workers, employees, government officials, or other aspects of context.

In particular embodiments, at step 412, the corrected first text may be transmitted from the first classifier (for example, source classifier 142) to a generator 160. As an example and not by way of limitation, generator 160 may include decoder module 162 and/or distribution module 164. As an example and not by way of limitation, decoder module 162 may tokenize the corrected first text. At step 414, generator 160 may calculate a distribution corresponding to one or more tokens of the corrected first text via distribution module 164.

In particular embodiments, at step 416, generator 160 may determine, based on the distribution of step 414, one or more words for replacement within the corrected first text.

In particular embodiments, at step 418, generator 160 may determine one or more candidate replacement words corresponding to each word for replacement within the corrected first text. In particular embodiments, generator 160 may transmit the rephrased text to a second classifier.

In particular embodiments, at step 420, a second classifier (for example, output classifier 170) may calculate a probability value for each of the one or more candidate replacement words, as determined in step 418.

In particular embodiments, at step 422, the second classifier (for example, output classifier 170) may generate a second text. As an example and not by way of limitation, the second text may contain one or more replacement words associated with a probability value above a predetermined threshold.

In particular embodiments, at step 424, the second text may be transmitted by the second classifier (for example, output classifier 170) to a graphical control element for display at computing device 102. Before transmitting, output classifier 170 may execute summary suggestion instructions 148 and ranking instructions 150, and the resulting suggestion set 132 (for example, the second text) may be transmitted to computing device 102 for display in a graphical control element.

Figure 5:
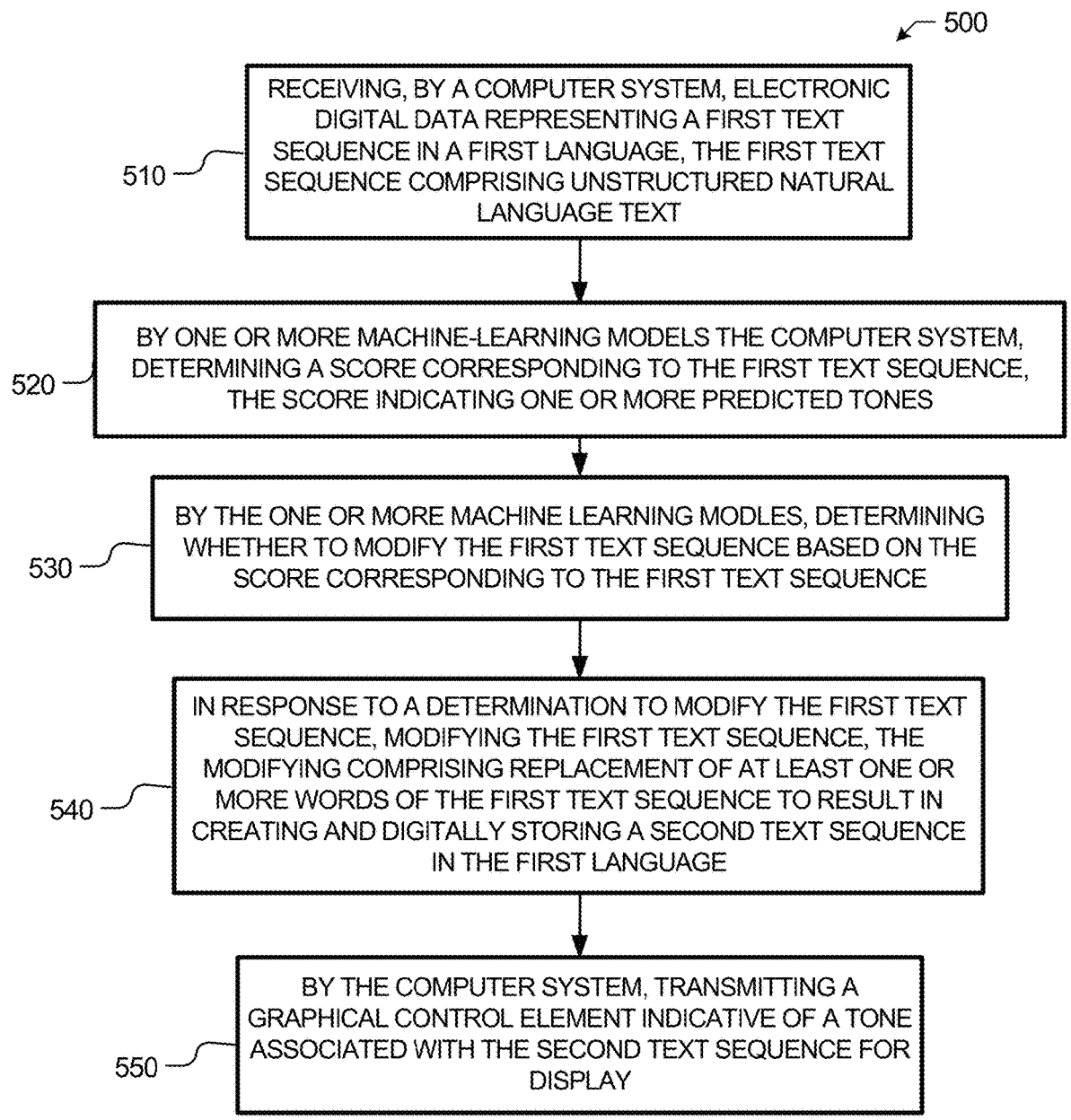
FIG. 5 illustrates a flow diagram of a process that may be executed by at least one device of the computer system of FIG. 1.

FIG. 5 illustrates a flow diagram 500 of a process that may be executed by at least one device of the computer system of FIG. 1.

The operations of process 500 as shown in FIG. 5 may be implemented using processor-executable instructions stored in computer memory. Although this disclosure describes the process of FIG. 5 as being performed by computing system 100, this disclosure contemplates any suitable system, device, or implemented techniques.

In particular embodiments, at step 510, using a computer system, the process may receive electronic digital data representing a first text sequence in a first language (for example, original source text). As an example and not by way of limitation, the first text sequence may comprise unstructured natural language text. For example, as described in FIG. 1, text processing extensions 110A, 110B may be programmed to receive the first text sequence and subsequently transmitting the first text sequence to text processor 140.

In particular embodiments, at step 520, one or more machine-learning models of the computer system may determine a score corresponding to the first text sequence. The score may be determined via a series of filters and/or rule-based classifiers as compared to a pre-defined threshold. As an example and not by way of limitation, the score may indicate one or more predicted tones corresponding to the first text sequence. In particular embodiments, text processor 140 may transmit the first text sequence to source classifier 142. As an example and not by way of limitation, source classifier 142 may comprise one or more machine-learning models, and the machine-learning models may determine a score corresponding to the first text sequence.

In particular embodiments, at step 530, the machine-learning models may determine whether to modify the first text sequence based on the score corresponding to the first text sequence. As an example and not by way of limitation, the score associated with the first text sequence, as determined by source classifier 142 may indicate that the first text sequence should be modified, in which case source classifier 142 may transmit the first text sequence and associated score to generator 160. As another example and not by way of limitation, the score associated with the first text sequence, as determined by source classifier 142 may indicate that the first text sequence should not be modified, in which case source classifier 142 may leave the first text sequence as is (for example, without modification).

In particular embodiments, at step 540, in response to a determination by the one or more machine-learning models to modify the first text sequence, the computer system may modify the first text sequence. The modification may comprise replacement of at least one or more words of the first text sequence to result in creating and digitally storing a second text sequence in the first language. As an example and not by way of limitation, in response to a determination by the one or more machine-learning models (for example, source classifier 142) to modify the first text sequence, the machine-learning models may transmit the first text sequence to generator 160. Generator 160 may analyze the first text sequence with decoder module 162. As an example and not by way of limitation, decoder module 162 and distribution module 164 may produce a distribution for the next token in a particular sentence of the first text sequence. In response to determining the distribution via distribution module 164, generator 160 may evaluate a plurality of candidate replacement words. Generator 160 may determine a plurality of candidate replacement words with each respective replacement word containing a different probability.

In particular embodiments, generator 160 may transmit the first text sequence, list of candidate replacement words, and probability values associated with the candidate replacement words to output classifier 170. As an example and not by way of limitation, output classifier may return a probability value and measure the probability value against a pre-determined threshold.

As an example and not by way of limitation, if output classifier 170 determines the probability value is low, classifier 170 will not generate summary suggestion instruction 148. As another example and not by way of limitation, if output classifier 170 determines the probability value is above the pre-determined threshold, output classifier 170 may generate summary suggestion instructions 148 and ranking instructions 150 for transmittal to computing device 102 via suggestion set 132.

In particular embodiments, at step 550, the computer system may be programmed to transmit one or more graphical control elements indicative of a tone associated with the second text for display on computing device 102.

2.4 Tone Transformation Examples

In various embodiments, output classifier 170) may be trained on training datasets representing original text and transformed text relating to one of a plurality of different specific tones; training datasets, original text, and transformed text may be labeled with tone values corresponding to a plurality of tones to enable the system to specify, in suggestions of rewrites, which tone has been addressed. The following sections provide examples of original text and rewritten text that could appear in training data or output suggestions in various embodiments. Thus, each of the tables is intended to represent digitally stored data for training datasets or the result of evaluating an original text shown in the tables using a trained machine learning model to generate the output rewrite shown in the tables.

2.4.1 Confident Tone

As demonstrated below in Table 1, the original source text may represent text with a less confident tone, and the rewrite may represent text with a more confident tone.

TABLE 1

| Original (Less Confident) | Rewrite (More Confident) |
|---|---|
| I guess I would say that's sort of our goal. | That's our goal. |
| I feel like it would be great if we met about this tomorrow. | I would like to meet about this tomorrow. Let's meet about this tomorrow. |
| I thought maybe I should share the agenda for next week's event. | I should share the agenda for next week's event. It makes sense for me to share the agenda for next week's event. |
| I was just hoping to follow up with you about the Thursday event, if you have the time. | Let's talk about the Thursday event, if you have time. |

In the example of Table 1, the underlined portions of the text represent hedges. In particular embodiments, one or more machine-learning models (for example, source classifier 142, output classifier 170) may be trained on particular definitions of the tone "confident." As an example and not by way of limitation, a confident tone may be a tone in which the writer appears self-assured (for example, believing in one's own ideas and opinions), competent (for example, having adequate expertise or credit), and/or knowledgeable (for example, having an adequate familiarity and awareness of facts). In particular embodiments, the machine-learning models may be trained to maintain politeness and/or friendliness. As another example and not by way of limitation, the machine-learning models may be trained to reduce expressions of non-essential uncertainty in sentences.

In particular embodiments, the machine-learning models may utilize hedging to modulate personal commitment and leave room for the user and/or reader's judgement. For example, the presence of hedging words or phrases such as "seem" or "I think" does not automatically mean that the sentence lacks self-confidence, but rather depends on context. If a sentence does not feel as though it lacks confidence, source classifier 142 may determine it is not a good candidate for rewrite. Examples of hedge types may include but are not limited to modal verbs (for example, can, should, would), approximative words (for example, somewhat, about, most), evidential words (for example, seem, appear), tag questions (for example, "isn't that right?"), adverbs (for example, likely), and/or any other suitable hedge type.

In particular embodiments, one or more machine-learning models may be trained to avoid generating rewrite suggestions 240 that may change the meaning of the original source text as a whole. Table 2, below, displays example increasing confidence levels and decreasing amounts of hedging for the sentence "I think we may want to consider auditing the feature."

TABLE 2

| Confidence level | Amount of hedging | Example sentence | Meaning |
|---|---|---|---|
| 0 | More hedging | *I think we may want to consider auditing the feature.* | Tentative suggestion for contemplation |
| 1 | Moderate hedging | *We may want to consider auditing the feature.* | Suggestion for contemplation |
| 2 | Little hedging | *Let's consider auditing the feature.* | Request for contemplation |
| 3 | No hedging | *Let's audit the feature.* | Request (with no room for contemplation) |

In the example of Table 2, reducing the amount of hedging may also incrementally change the sentences meaning. In this example, Confidence Level "2" may be presented as a rephrase suggestion 240, while Confidence Level "3" may be determined to be too meaning-changing, and therefore not presented as a rephrase suggestion 240.

2.4.2 Softening Tone

In particular embodiments, source classifier 142 may be trained to avoid a "rude", "forceful", or "tentative" tone. As an example and not by way of limitation, source classifier 142 may be trained to determine "over-explaining", by which a user may convey uncertainty. In this example, generator 160 may determine candidate modifications to the original source text that reframe the text to plainly state actions and intentions, rather than hedge or provide extraneous information that diminishes one's perceived decisiveness.

In particular embodiments, source classifier 142 may be programmed to avoid "softening" language. As an example and not by way of limitation, generator 160 may determine candidate modifications to the original source text to reframe the text to eliminate softening language. Table 3, below, demonstrates examples of unacceptable and acceptable rewrites of the sentence "If you're okay with it, I could maybe schedule a meeting for us?"

TABLE 3

| Original | Unacceptable rewrite | Acceptable rewrite |
| --- | --- | --- |
| *If you're okay with it, I could maybe schedule a meeting for us?* | I will schedule a meeting for us. | I can schedule a meeting for us. |
| | *If you're okay with it, I'd be happy to* schedule a meeting for us. *If you agree, I'd be happy to* schedule a meeting for us. | I'd be happy to schedule a meeting for us. |

2.4.3 Friendly Tone

In an embodiment, source classifier 142 may be trained to detect original text not expressing a friendly tone and to suggest rewritten text having a more friendly tone. Training data can be configured to target sentences that may come across as impersonal, stiff or robotic and to rewrite sentences to make the tone more personable, warm, friendly, kind, thoughtful or enthusiastic. Example training data and transformations can include those of TABLE 4:

TABLE 4

| Original | Friendlier |
| --- | --- |
| I'm reaching out to you regarding your cancellation request. | I wanted to reach out to you about your cancellation request. |
| I look forward to speaking with you to determine what needs to be done to move forward. | I'm looking forward to speaking with you to figure out what needs to be done to move forward. |
| Let me know if you have any questions, I'm happy to assist | Feel free to let me know if you have any questions, I'm happy to help. |

2.4.4 Personable Tone

A personable tone conveys personal feelings and attitudes and is perceived as more friendly, warm, kind, thoughtful, enthusiastic, and generally more personalized while still remaining professional. In an embodiment, source classifier 142 may be trained to detect original text not expressing a personable tone and to suggest rewritten text having a more friendly tone. Training data can be configured to target sentences that may come across as impersonal and to rewrite sentences to make the tone more personable. Example training data and transformations can include those of TABLE 5:

TABLE 5

| Impersonal Tone | Personable Tone |
| --- | --- |
| Any idea on how to improve? | Can you share any ideas you have on how to improve? |
| Your prompt attention to this is greatly appreciated. | I'd appreciate it if you could address this as soon as possible. |
| Be advised that I have contacted them for the camera roll. | Just to let you know, I have contacted them for the camera roll. |

Bizspeak/canned speech is similar to impersonal speech. The language often used in business contexts is seen as robotic, over-used, auto-pilot communication that comes off as overly-formal, stilted, and impersonal. Embodiments can be trained to rewrite sentences to transform Bizspeak phrases and sentences. TABLE 6 shows examples that could be used in training data.

TABLE 6

| Bizspeak | More personable |
| --- | --- |
| As per your request | As you requested |
| We are in receipt of | We've received |
| We shall advise you | We'll let you know |
| At your earliest convenience | As soon as you can |
| Please see enclosed . . . for your reference | I am sharing . . . for you to take a look at |
| Sorry for the late reply | My apologies for the slow reply |
| | Sorry for not getting back to you sooner |
| | I'd hoped to get back to you sooner |
| | Sorry for the delay in getting back to you |
| | Sorry I wasn't able to get back to you sooner |
| Your prompt attention to this is greatly appreciated. | I'd appreciate it if you could address this as soon as possible. |
| Please be kind enough to . . . | Please . . . / ~~Could you please...~~ |

The use of some specific words and constructions can have a stilted feel that contributes to an impersonal tone. TABLE 7 shows examples of training data with Bizspeak source text and transformed text that can be substituted in one embodiment. Accessible language is more personable.

| Bizspeak | Accessible |
| --- | --- |
| inquiry | question |
| inquire | ask |
| peruse | look at/look over/read through |
| pursuant to | according to/following |
| request/requested | asked for/would like |
| prompt | quick/fast |
| with respect to/with regards to | regarding/about |
| depart | leave |
| commence | begin |
| kindly | please |
| should you require | if you need |

TABLE 8 provides further examples of possible training data with impersonal source text and rewrites.

TABLE 8

| Impersonal | Re-writes |
| --- | --- |
| Please see attached file, for your file | I've attached a file that you'll need for your file. |
| Note, aging invoices may result in disruption of service. | Just so you know, aging invoices may wind up disrupting service. |
| Thank you for that information. | Thank you for sharing that with me. |
| Kindly do the needful. | Please do what is needed. |
| Please find attached your contract. | I've attached your contract here. |
| Any feedback? | Do you have any feedback for me? |
| If you require further information, kindly inform me. | If you need more information, let me know. |
| I'd like to propose the following deliverables for this collaboration. | I'd like to suggest getting the following out of working together this time. |
| I am writing to announce my enthusiasm to continue my education toward a Ph. D. | I am writing to let you know how excited I am to work toward a Ph. D. |
| For future reference, what is the delivery period? | So I know for the future, what is the delivery period? |
| Kindly arrange the interview. | Please set up the interview. |
| I sent the message to make sure we all touch base regarding the issue. | I sent the message to make sure we can all discuss the issue. |

2.4.5 Other Transformations

As an example and not by way of limitation, generator 160 may determine a plurality of rewrite suggestions 240 and transmit the rewrite suggestions 240 to output classifier 170, and output classifier 170 may score each of rewrite suggestions 240 according to one or more predetermined rules.

In particular embodiments, source classifier 142 may be programmed to avoid deflection. As an example and not by way of limitation, generator 160 may be programmed to identify deflection such as deflecting credit for accomplishments, downplaying effort, redirecting praise, self-deprecating remarks, and/or other deflective comments. In this example, generator 160 may identify rewrite suggestions 240 that acknowledge the user's effort while avoiding tones of impoliteness or arrogance.

In particular embodiments, source classifier 142 may be programmed in accordance with one or more rephrasing rules. As an example and not by way of limitation, a rephrasing rule may include instructions to avoid rewriting quoted content, such as dialogue. As another example and not by way of limitation, a rephrasing rule may include instructions to avoid converting statements into questions. Source classifier 142 may be trained to avoid rewriting personal content and experiences, or avoid rewriting apologies. Other examples of rephrasing rules may include avoiding wordy rewrites, avoiding purely grammatical revisions, avoiding purely stylistic revisions, not introducing non-English words, not introducing sensitive or offensive language, not introducing gendered language, or other suitable rewrite rules.

In particular embodiments, source classifier 142 may instruct generator 160 to modify the original source text to add or remove personal references to either generate text in accordance with a personable or impersonal. Source classifier 142 may instruct generator 160 to modify language often used in business context (for example, Bizspeak), as business language may be scored as robotic, overly-formal, and/or impersonal.

The approaches disclosed herein provide efficient technical means for automatically updating a text that has been written using computer support. Unlike past approaches, the intent of a source text may be detected programmatically and then used to drive automatic machine selection of candidate phrase suggestions, with ranking if appropriate to eliminate candidate phrase suggestions that are too similar to one another. An ancillary benefit is that the accuracy, tone, and clarity of written communication may be improved with computer assistance. The approaches herein provide efficient machine assistance in finding text that accurately reflects the original intent of their draft text.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
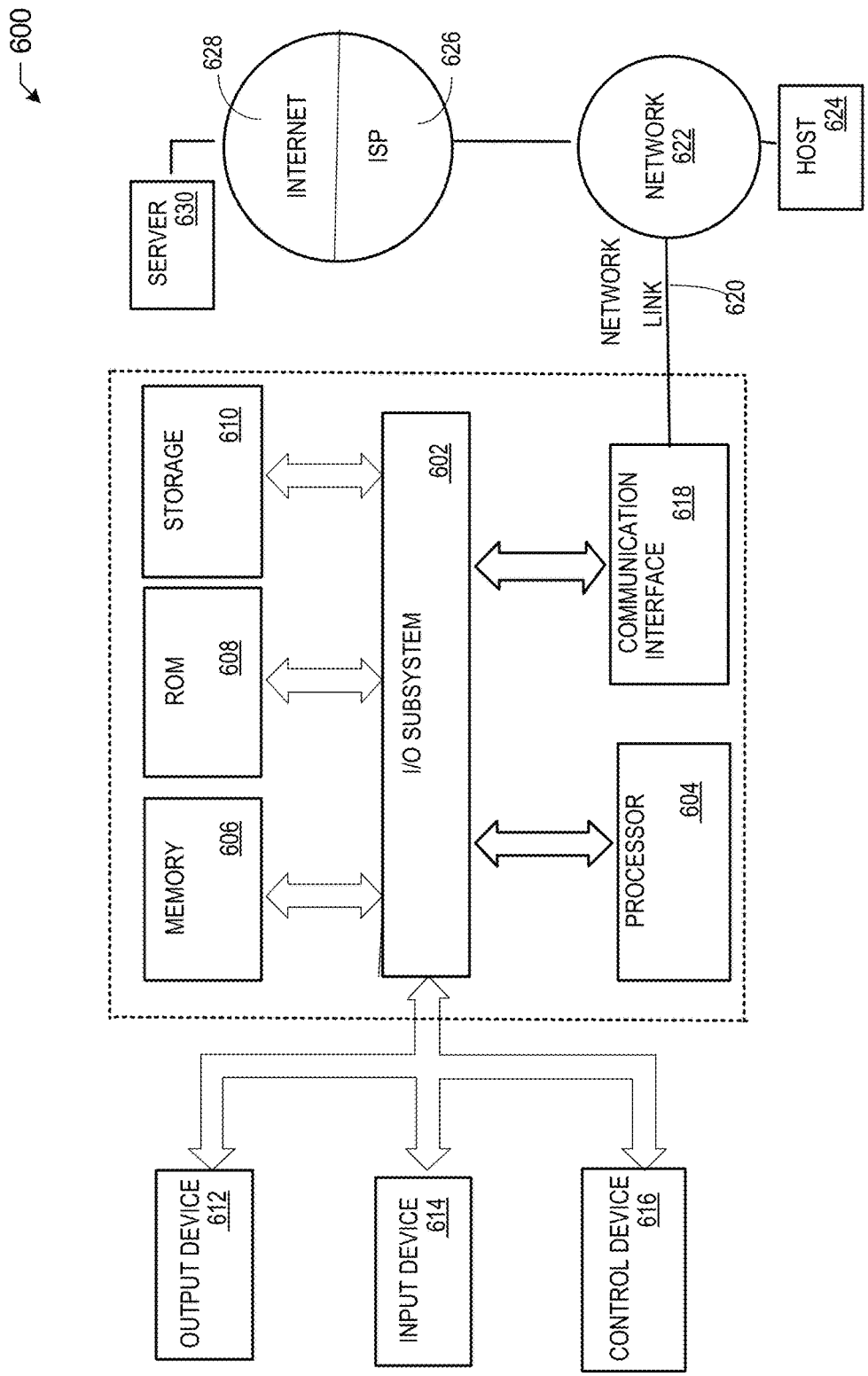
FIG. 6 illustrates a computer system with which one embodiment could be implemented.

FIG. 6 is a block diagram that illustrates an example computer system 600 with which an embodiment may be implemented. In the example of FIG. 5, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanisms for communicating information and/or instructions between the components of the computer system 600 over electronic signal paths. The I/O subsystem 602 may include an I/O controller, a memory controller, and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or another dynamic storage device. Memory 606 also may be used for storing temporary variables or other intermediate information during the execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read-only memory (ROM) 608 or other static storage devices coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disks such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as extensions, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include another type (s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (INU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or another type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS extension that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 and place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to a network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a worldwide packet data communication network represented as internet 628. A server computer 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm, or other organization of computers that cooperate to perform tasks or execute applications or services. Server 630 may comprise one or more sets of instructions that are organized as extensions, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer, and data storage layer such as a relational database system using a structured query language (SQL) or no SQL, an object store, a graph database, a flat-file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
   receiving, by a computer system, electronic digital data representing a first text sequence in a first language, the first text sequence comprising unstructured natural language text;
   by one or more machine-learning models of the computer system, determining a score corresponding to the first text sequence, the score being determined by one or more rule-based filters and indicating one or more predicted tones;
   by the one or more machine-learning models, determining whether to modify the first text sequence based on the score corresponding to the first text sequence;
   in response to a determination to modify the first text sequence, modifying the first text sequence, the modifying comprising replacement of at least one or more words of the first text sequence to result in creating and digitally storing a second text sequence in the first language; and
   by the computer system, transmitting a graphical control element indicative of a tone associated with the second text sequence for display; and
   in response to a determination not to modify the first text sequence, digitally store the first text sequence without modification.

2. The computer-implemented method of claim 1, further comprising using dependency relation data associated with a word pair of the first text sequence to compute the score, the dependency relation data being determined by an identified syntactic structure of the first text sequence.

3. The computer-implemented method of claim 2, further comprising using a digital lexicon to associate the identified syntactic structure of the first text sequence with a one or more tone labels.

4. The computer-implemented method of claim 1, further comprising using modifier relation data associated with a word pair of the first text sequence to increase or decrease the score of the first text sequence.

5. The computer-implemented method of claim 1, further comprising, before the transmitting, ranking the tones associated with the first and second text sequences based on a ranking criterion.

6. The computer-implemented method of claim 5, further comprising generating a graphical control element based on the ranking criterion, the graphical control element representing a scale.

7. The computer-implemented method of claim 1, further comprising generating, by the computer system, an output set of summary points and corresponding suggestions.

8. The computer-implemented method of claim 7, further comprising:
   ranking the output set of summary points and corresponding suggestions based on a ranking criterion; and
   transmitting a graphical control element of the output set of summary points and corresponding suggestions based on the ranking criterion for display.

9. The computer-implemented method of claim 7, further comprising:
   causing outputting of a set of graphical control elements, a graphical control element of the set of graphical control elements indicative of a candidate tone of a set of candidate tones;
   receiving tone ranking data; and
   modifying the output set of summary points and corresponding suggestions.

10. The computer-implemented method of claim 1, the modifying of the first text sequence further comprising;
    determining a confidence level score of the first text sequence, the confidence level corresponding to a determined amount of hedging; and
    generating one or more replacement text sequences, each respective text sequence corresponding to a particular confidence level score.

11. The computer-implemented method of claim 1, the modifying of the first text sequence determined by one or more pre-determined rules.

12. The computer-implemented method of claim 1, further comprising using a digital lexicon to associate at least one word of the first text sequence with a tone label.

13. One or more non-transitory computer-readable media storing one or more sequences of instructions which, when executed, cause a computer system to execute:
    receiving, by a computer system, digital data representing a first text sequence in a first language, the first text sequence comprising unstructured natural language text;
    by one or more machine-learning models of the computer system, determining a score corresponding to the first text sequence, the score being determined by one or more rule-based filters and indicating one or more predicted tones;
    by the one or more machine-learning models, determining whether to modify the first text sequence based on the score corresponding to the first text sequence;
    in response to a determination to modify the first text sequence, modifying the first text sequence, the modifying comprising replacement of at least one or more words of the first text sequence to result in creating and digitally storing a second text sequence in the first language; and
    by the computer system, transmitting a graphical control element indicative of a tone associated with the second text sequence for display; and in response to a determination not to modify the first text sequence, digitally store the first text sequence without modification.

14. The one or more computer-readable media of claim 13, further comprising using dependency relation data associated with a word pair of the first text sequence to compute the score, the dependency relation data being determined by an identified syntactic structure of the first text sequence.

15. The one or more computer-readable media of claim 14, further comprising using a digital lexicon to associate the identified syntactic structure of the first text sequence with a one or more tone labels.

16. The one or more computer-readable media of claim 13, further comprising using modifier relation data associated with a word pair of the first text sequence to increase or decrease the score of the first text sequence.

17. The one or more computer-readable media of claim 13, further comprising, before the transmitting, ranking the tones associated with the first and second text sequences based on a ranking criterion.

18. The one or more computer-readable media of claim 17, further comprising generating a graphical control element based on the ranking criterion, the graphical control element representing a scale.

19. The one or more computer-readable media of claim 13, further comprising generating, by the computer system, an output set of summary points and corresponding suggestions.

20. A computer system comprising:
one or more processors; and
a non-transitory memory coupled to the processors comprising instructions executable by the processors, the processors operable when executing the instructions to:
  receive, by a computer system, electronic digital data representing a first text sequence in a first language, the first text sequence comprising unstructured natural language text;
  by one or more machine-learning models of the computer system, determine a score corresponding to the first text sequence, the score being determined by one or more rule-based filters and indicating one or more predicted tones;
  by the one or more machine-learning models, determine whether to modify the first text sequence based on the score corresponding to the first text sequence;
  in response to a determination to modify the first text sequence, modify the first text sequence, the modifying comprising replacement of at least one or more words of the first text sequence to result in creating and digitally storing a second text sequence in the first language; and
  by the computer system, transmit a graphical control element indicative of a tone associated with the second text sequence for display; and
  in response to a determination not to modify the first text sequence, digitally store the first text sequence without modification.

\* \* \* \* \*